United States Patent
Zhang et al.

(10) Patent No.: US 8,780,821 B2
(45) Date of Patent: Jul. 15, 2014

(54) CHANNEL INTERLEAVER FOR TRANSMISSION OF MULTIPLE CODE BLOCKS IN A WIRELESS COMMUNICATION SYSTEM

(75) Inventors: Xiaoxia Zhang, San Diego, CA (US);
Juan Montojo, San Diego, CA (US);
Peter Gaal, San Diego, CA (US);
Wanshi Chen, San Diego, CA (US);
Xiliang Luo, Northridge, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1012 days.

(21) Appl. No.: 12/707,196

(22) Filed: Feb. 17, 2010

(65) Prior Publication Data

US 2010/0215007 A1    Aug. 26, 2010

Related U.S. Application Data

(60) Provisional application No. 61/154,319, filed on Feb. 20, 2009.

(51) Int. Cl.
*H04W 4/00* (2009.01)
*H04B 7/216* (2006.01)

(52) U.S. Cl.
USPC .......................................... 370/329; 370/335

(58) Field of Classification Search
USPC ............................................................ 370/329
See application file for complete search history.

(56) References Cited

U.S. PATENT DOCUMENTS

| 8,094,547 B2 * | 1/2012 | Sung et al. ..................... 370/208 |
| 8,379,738 B2 * | 2/2013 | Pi et al. ............................ 375/260 |
| 2007/0054626 A1 * | 3/2007 | Li et al. ............................. 455/69 |
| 2008/0108310 A1 * | 5/2008 | Tong et al. ....................... 455/69 |
| 2008/0225965 A1 * | 9/2008 | Pi et al. ............................ 375/260 |
| 2008/0291860 A1 | 11/2008 | Vijayan et al. |
| 2008/0311920 A1 * | 12/2008 | Xu et al. .......................... 455/450 |
| 2008/0317146 A1 * | 12/2008 | Kwon et al. .................... 375/260 |

FOREIGN PATENT DOCUMENTS

WO    WO2008087603    7/2008

OTHER PUBLICATIONS

Forward Data Channel Single Input Single Output Mode Data Packet Transmission—9.4.1.2.5.4.2, IEEE Standard for LAN/MAN-Part 20: Air Interface for Mobile Broadband, p. 561-562, 2008.
International Search Report and Written Opinion—PCT/US2010/024534, International Search Authority—European Patent Office—Sep. 23, 2010.
Reverse Orthogonal Frequency Division Multiple Access Data Channel Data packet modulation—9.3.1.3.4.4.2, IEEE Standard for LAN/MAN-Part 20: Air Interface for Mobile Broadband, p. 516-517, 2008.
Taiwan Search Report—TW099105053—TIPO—May 8, 2013.

* cited by examiner

*Primary Examiner* — Guang Li
(74) *Attorney, Agent, or Firm* — Peng Zhu

(57) ABSTRACT

Techniques for performing channel interleaving to achieve similar SINRs for multiple code blocks are described. In one design, a transmitter station (e.g., a base station or a UE) determines a plurality of resource groups assigned for data transmission. Each resource group includes a plurality of resource elements formed by a cluster of subcarriers in a time interval. The transmitter station partitions a transport block into a plurality of code blocks, processes each code block to obtain data symbols for that code block, and maps the data symbols for each code block to at least one resource element in each of the plurality of resource groups. The transmitter station transmits the mapped data symbols for the plurality of code blocks to a receiver station. In one design, the transmitter station receives an ACK or a NACK for the transport block and retransmits all code blocks if a NACK is received.

29 Claims, 13 Drawing Sheets

Data Symbols for Code Block 1: $a_1, a_2, a_3, a_4, a_5, a_6, a_7, a_8, a_9, a_{10}, a_{11}, a_{12}, a_{13}, a_{14}, a_{15}, a_{16}, a_{17}, a_{18}, a_{19}$ Data Symbols for Code Block 2: $b_1, b_2, b_3, b_4, b_5, b_6, b_7, b_8, b_9, b_{10}, b_{11}, b_{12}, b_{13}, b_{14}, b_{15}, b_{16}, b_{17}, b_{18}, b_{19}$ Data Symbols for Code Block 3: $c_1, c_2, c_3, c_4, c_5, c_6, c_7, c_8, c_9, c_{10}, c_{11}, c_{12}, c_{13}, c_{14}, c_{15}, c_{16}, c_{17}, c_{18}, c_{19}$ Data Symbols for Code Block 4: $d_1, d_2, d_3, d_4, d_5, d_6, d_7, d_8, d_9, d_{10}, d_{11}, d_{12}, d_{13}, d_{14}, d_{15}, d_{16}, d_{17}, d_{18}, d_{19}$ Data Symbols for Code Block 5: $e_1, e_2, e_3, e_4, e_5, e_6, e_7, e_8, e_9, e_{10}, e_{11}, e_{12}, e_{13}, e_{14}, a_{15}, e_{16}, e_{17}, e_{18}, e_{19}$

FIG. 7

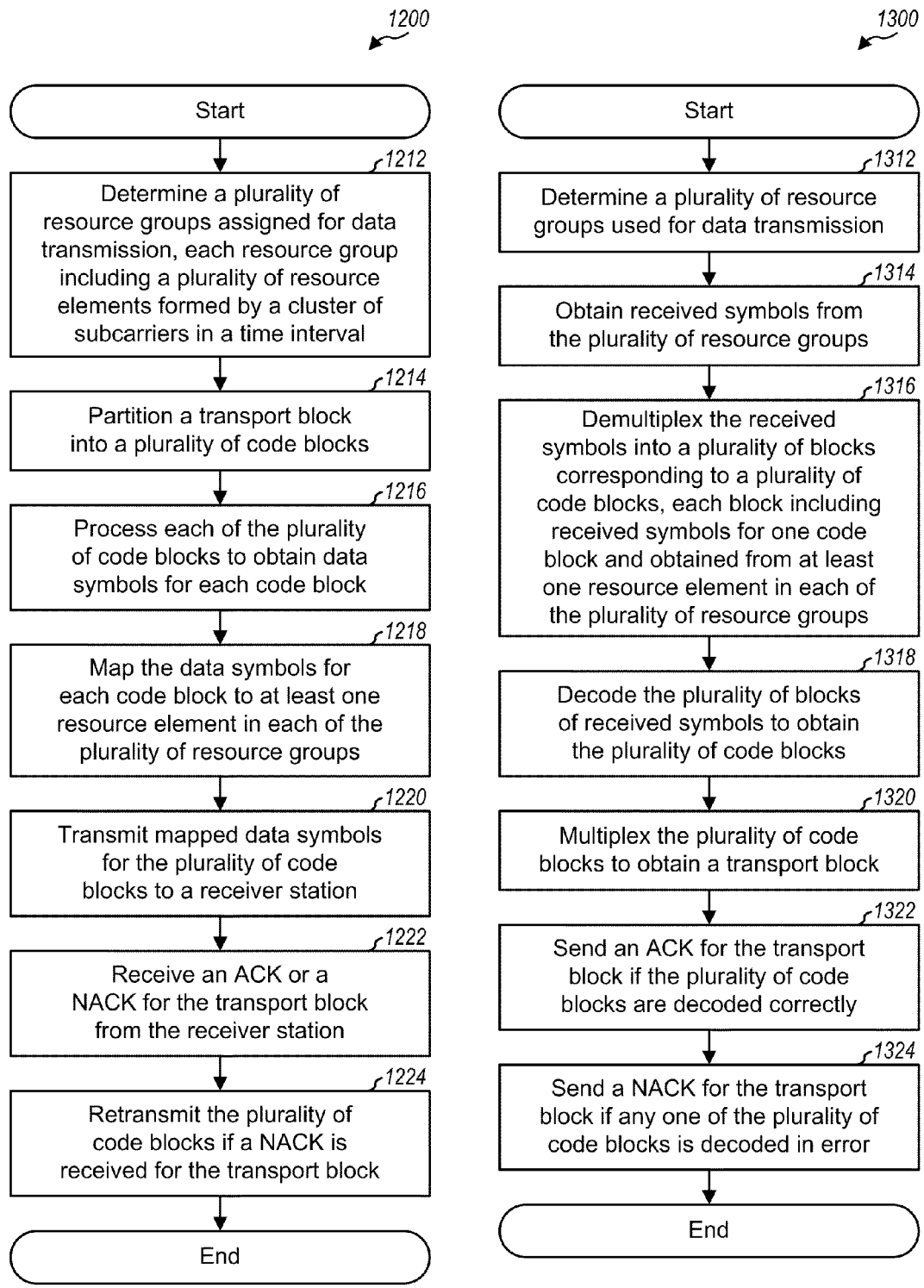

CHANNEL INTERLEAVER FOR TRANSMISSION OF MULTIPLE CODE BLOCKS IN A WIRELESS COMMUNICATION SYSTEM

The present application claims priority to provisional U.S. Application Ser. No. 61/154,319, entitled "CHANNEL INTERLEAVER FOR TRANSMISSION OF MULTIPLE CODE BLOCKS IN A WIRELESS COMMUNICATION SYSTEM," filed Feb. 20, 2009, and incorporated herein by reference.

BACKGROUND

I. Field

The present disclosure relates generally to communication, and more specifically to techniques for transmitting data in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A base station may communicate with a UE via wireless channel. The wireless channel may experience different channel conditions (e.g., different fading, multipath, and interference effects) and may achieve different signal-to-noise-and-interference ratios (SINRs) across time and/or frequency. It may be desirable to transmit data in a manner to achieve good performance even in the presence of varying SINRs across time and/or frequency.

SUMMARY

Techniques for performing channel interleaving for multiple code blocks to achieve similar SINRs for all code blocks are described herein. The SINR balancing may improve performance of data transmission, especially if a single acknowledgement (ACK) or negative acknowledgement (NACK) is sent for the multiple code blocks.

In one design, a transmitter station (e.g., a base station or a UE) may determine a plurality of resource groups assigned for data transmission. Each resource group may include a plurality of resource elements formed by a cluster of subcarriers in a time interval (e.g., a slot or a subframe). The plurality of resource groups may cover different non-contiguous clusters of subcarriers. Each resource element may cover one subcarrier in one symbol period and may be used to send one modulation symbol. The transmitter station may partition a transport block into a plurality of code blocks and may process (e.g., encode and modulate) each code block to obtain data symbols for the code block. The transmitter station may map the data symbols for each code block to at least one resource element in each of the plurality of resource groups. This mapping may be performed in various manners, as described below. The transmitter station may transmit the mapped data symbols for the plurality of code blocks to a receiver station. The transmitter station may thereafter receive an ACK or a NACK for the transport block from the receiver station. The transmitter station may retransmit the plurality of code blocks if a NACK is received for the transport block.

In one design, the receiver station may obtain received symbols from the plurality of resource groups. The receiver station may demultiplex the received symbols into a plurality of blocks corresponding to the plurality of code blocks. The demultiplexing may be performed in a manner complementary to the channel interleaving performed by the transmitter station. Each block may comprise received symbols for one code block. The receiver station may decode the plurality of blocks of received symbols to obtain the plurality of code blocks. The receiver station may multiplex the plurality of code blocks to obtain the transport block. The receiver station may send an ACK for the transport block if all code blocks are decoded correctly and may send a NACK for the transport block if any code block is decoded in error.

Various aspects and features of the disclosure are described in further detail below.

BRIEF DESCRIPTION OF THE DRAWINGS

FIG. 7 shows five sets of data symbols for five code blocks.
FIG. 12 shows a process for transmitting data.
FIG. 13 shows a process for receiving data.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
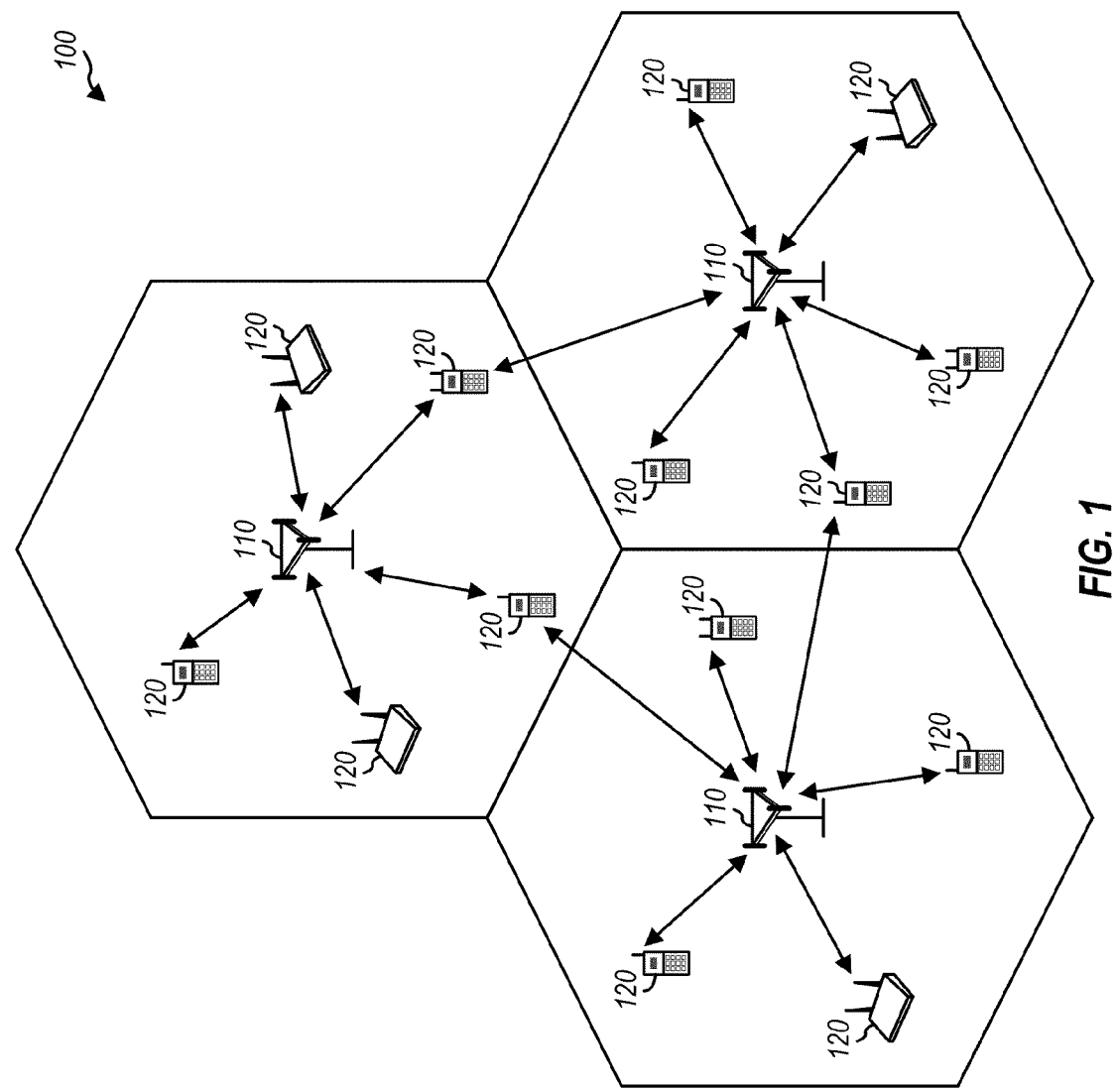
FIG. 1 shows a wireless communication system.

FIG. 1 shows a wireless communication system 100, which may be an LTE system or some other system. System 100 may include a number of evolved Node Bs (eNBs) 110 and other network entities. An eNB may be a station that communicates with the UEs and may also be referred to as a Node B, a base station, an access point, etc. Each eNB 110 may provide communication coverage for a particular geographic area and may support communication for UEs located within the coverage area.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with an eNB via the downlink and uplink. The downlink (or forward link) refers to the communication link from the eNB to the UE, and the uplink (or reverse link) refers to the communication link from the UE to the eNB. In the description herein, a "station" may be an eNB, a UE, or some other entity that can transmit and/or receive data.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 MHz, respectively.

Figure 2:
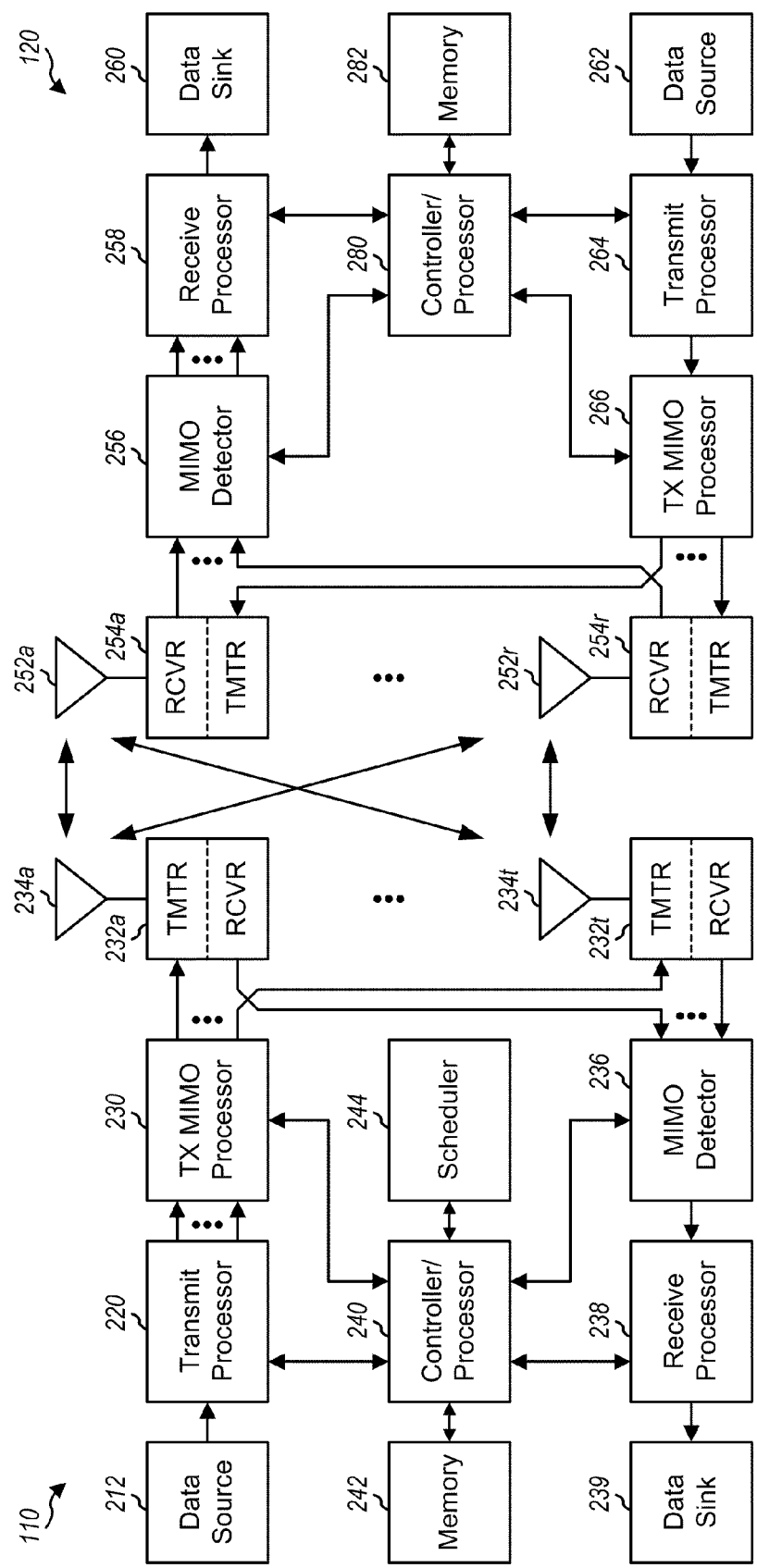
FIG. 2 shows a block diagram of a base station and a UE.

FIG. 2 shows a block diagram of a design of an eNB 110 and a UE 120, which may be one of the eNBs and one of the UEs in FIG. 1. eNB 110 may be equipped with T antennas 234a through 234t, and UE 120 may be equipped with R antennas 252a through 252r, where in general T≥1 and R≥1.

At eNB 110, a transmit processor 220 may receive data for one or more UEs from a data source 212, process (e.g., encode, modulate, and interleave) the data for each UE based on one or more transport formats selected for that UE, and provide data symbols for all UEs. A transport format may also be referred to as a modulation and coding scheme (MCS), a packet format, a rate, etc. Transmit processor 220 may also process control information from a controller/processor 240 and provide control symbols. Transmit processor 220 may further generate reference symbols for reference signals. In general, a data symbol is a modulation symbol for data, a control symbol is a modulation symbol for control information, a reference symbol is a modulation symbol for a reference signal, and a modulation symbol is a real or complex value. A modulation symbol may be generated based on a modulation scheme such as BPSK, QPSK, QAM, etc. A reference signal is a signal that is known a priori by a transmitter and a receiver and may also be referred to as pilot, training, etc. Transmit processor 220 may multiplex the data symbols, the control symbols, and the reference signal symbols and provide output symbols.

A transmit (TX) multiple-input multiple-output (MIMO) processor 230 may perform spatial processing (e.g., precoding) on the output symbols from transmit processor 220, if applicable, and provide T symbol streams to T transmitters (TMTRs) 232a through 232t. Each transmitter 232 may process a respective symbol stream (e.g., for OFDM, etc.) to obtain an output sample stream. Each transmitter 232 may further process (e.g., convert to analog, amplify, filter, and upconvert) the output sample stream to obtain a downlink signal. T downlink signals from transmitters 232a through 232t may be transmitted via T antennas 234a through 234t, respectively.

At UE 120, antennas 252a through 252r may receive the downlink signals from eNB 110 and provide received signals to receivers (RCVRs) 254a through 254r, respectively. Each receiver 254 may condition (e.g., filter, amplify, downconvert, and digitize) a respective received signal to obtain input samples. Each receiver 254 may further process the input samples (e.g., for OFDM, etc.) to obtain received symbols. A MIMO detector 256 may obtain received symbols from all R receivers 254a through 254r, perform MIMO detection on the received symbols if applicable, and provide detected symbols. A receive processor 258 may process (e.g., deinterleave, demodulate, and decode) the detected symbols, provide decoded data for UE 120 to a data sink 260, and provide decoded control information to a controller/processor 280.

On the uplink, at UE 120, data from a data source 262 and control information from controller/processor 280 may be processed by a transmit processor 264, precoded by a TX MIMO processor 266 if applicable, conditioned by transmitters 254a through 254r, and transmitted to eNB 110. At eNB 110, the uplink signals from UE 120 may be received by antennas 234, conditioned by receivers 232, processed by a MIMO detector 236 if applicable, and further processed by a receive processor 238 to obtain decoded data and control information transmitted by UE 120. Processor 238 may provide decoded data to a data sink 239 and decoded control information to controller/processor 240.

Controllers/processors 240 and 280 may direct the operation at eNB 110 and UE 120, respectively. Memories 242 and 282 may store data and program codes for eNB 110 and UE 120, respectively. A scheduler 244 may schedule UEs for downlink and/or uplink transmission and may provide assignments of resources for the scheduled UEs.

Figure 3:
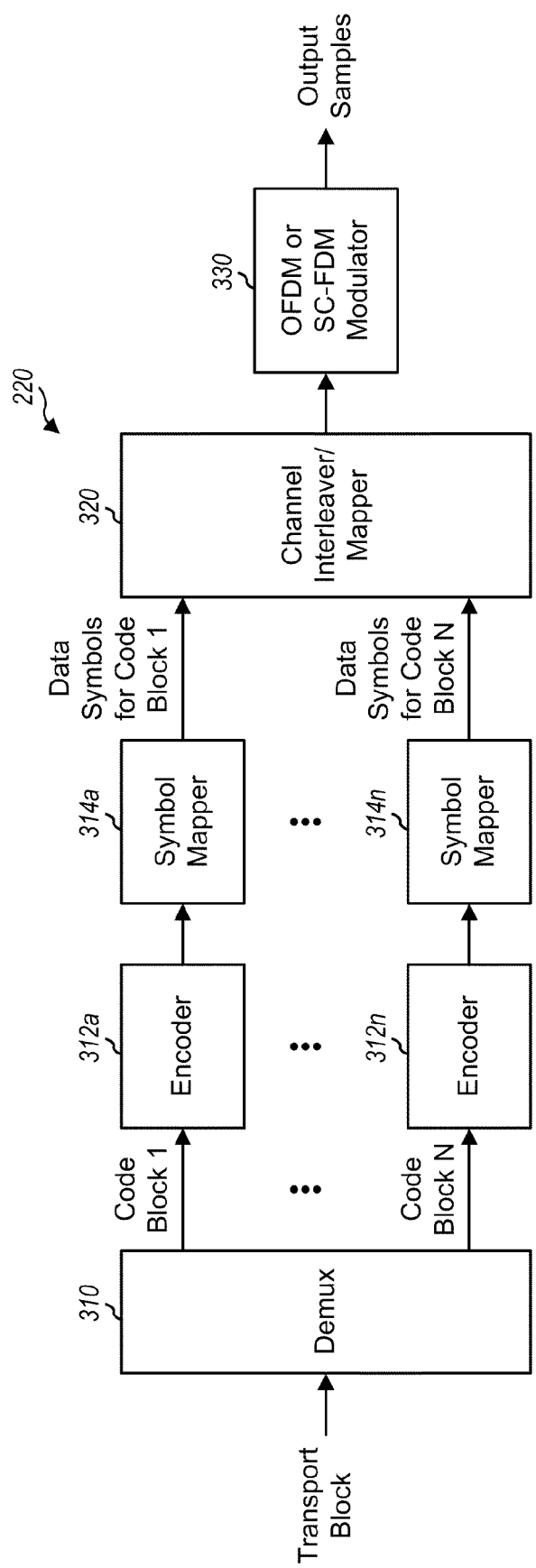
FIG. 3 shows a block diagram of a transmit processor.

FIG. 3 shows a block diagram of a design of transmit processor 220, which may also be used for transmit processor 264 in FIG. 2. For simplicity, FIG. 3 shows a case in which TX MIMO processor 230 is not present, and transmit processor 220 may provide output symbols directly to a modulator 330 within one transmitter 232.

Within transmit processor 220, a demultiplexer (Demux) 310 may receive a transport block of data (e.g., a data packet) and may partition the transport block into multiple (N) code blocks if the transport block is larger than a predetermined size (e.g., 6144 bits in LTE), where N>1. Each code block may be encoded and decoded separately. Demultiplexer 310 may provide the N code blocks to N encoders 312a through 312n, respectively. Each encoder 312 may encode its code block based on a selected coding scheme and code rate and may provide code bits to an associated symbol mapper 314. Each symbol mapper 314 may map its code bits to data symbols based on a selected modulation scheme. The code block size, code rate, and modulation scheme may be determined based on a transport format, which may be selected based on channel conditions, UE capability, availability of system resources, etc.

A channel interleaver/mapper 320 may receive data symbols from all N symbol mappers 314a through 314n and may map the data symbols to resource groups assigned for data transmission, as described below. Channel interleaver/mapper 320 may provide a set of output symbols for all subcarriers in each symbol period. Each output symbol may be a data symbol, a control symbol, a reference symbol, or a zero symbol with a signal value of zero. Modulator 330 may perform modulation on the output symbols for OFDM or SC-FDM and may provide output samples.

Figure 4:
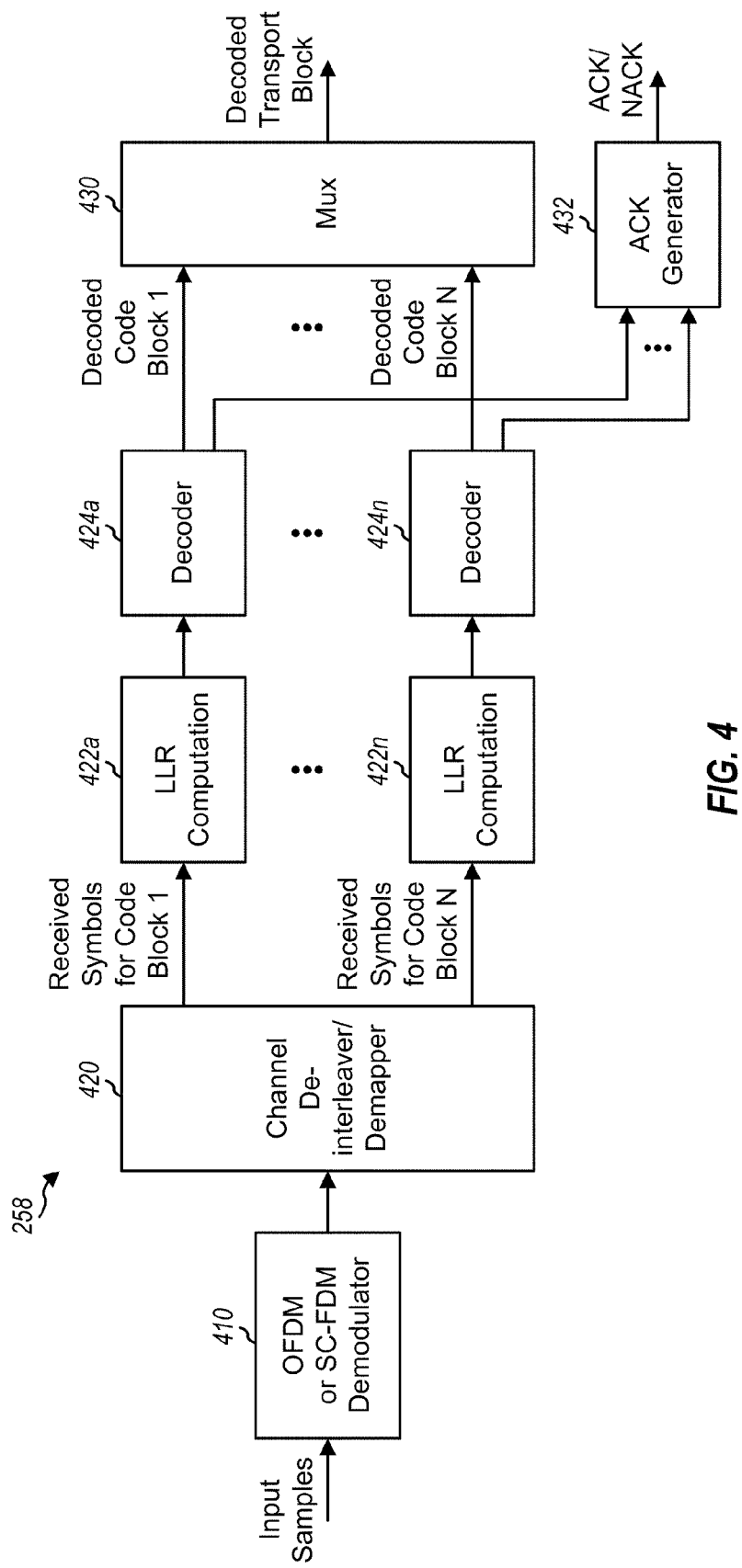
FIG. 4 shows a block diagram of a receive processor.

FIG. 4 shows a block diagram of a design of receive processor 258, which may also be used for receive processor 238 in FIG. 2. For simplicity, FIG. 4 shows a case in which MIMO detector 256 is not present, and a demodulator 410 within one receiver 254 may provide received symbols directly to receive processor 258.

Demodulator 410 may obtain input samples from an associated receiver 254, perform demodulation on the input samples for OFDM or SC-FDM, and provide received symbols for all subcarriers. A channel de-interleaver/demapper 420 may obtain the received symbols for all subcarriers in each symbol period and may determine the received symbols for each code block. Channel de-interleaver/demapper 420 may provide the received symbols for the N code blocks to N log-likelihood ratio (LLR) computation units 422a through 422n. Each LLR computation unit 422 may compute LLRs for the code bits of its code block based on the received symbols for the code block and may provide the LLRs to an associated decoder 424. Each decoder 424 may decode its LLRs and provide a decoded code block. A multiplexer (Mux) 430 may receive the N decoded code blocks from decoders 424a through 424n, multiplex the decoded code blocks, and provide a decoded transport block.

Each decoder 424 may also provide decoding status indicating whether its code block was decoded correctly or in error to an ACK generator 432. ACK generator 432 may receive the decoding status for all N code blocks from decoders 424a through 424n and may generate ACK information for the transport block. In one design, the ACK information may comprise a single ACK or NACK for the transport block, with an ACK indicating successful decoding of all N code blocks and a NACK indicating unsuccessful decoding of at least one code block. This design may be used to reduce signaling overhead. In another design, the ACK information may comprise an ACK or NACK for each code block. This design may be used to improve efficiency since only code blocks decoded in error are retransmitted. In any case, the ACK information may be sent to the eNB and used to (i) send a retransmission of the transport block (or code block) if a NACK is received, or (ii) send a transmission of a new transport block (or code block) if an ACK is received.

As shown in FIGS. 3 and 4, a transmitter station (e.g., an eNB) may partition a transport block into multiple (N) code blocks and may process and transmit the code blocks via a wireless channel. A receiver station (e.g., a UE) may receive and decode the N code blocks to obtain decoded code blocks for the transport block.

Figure 5:
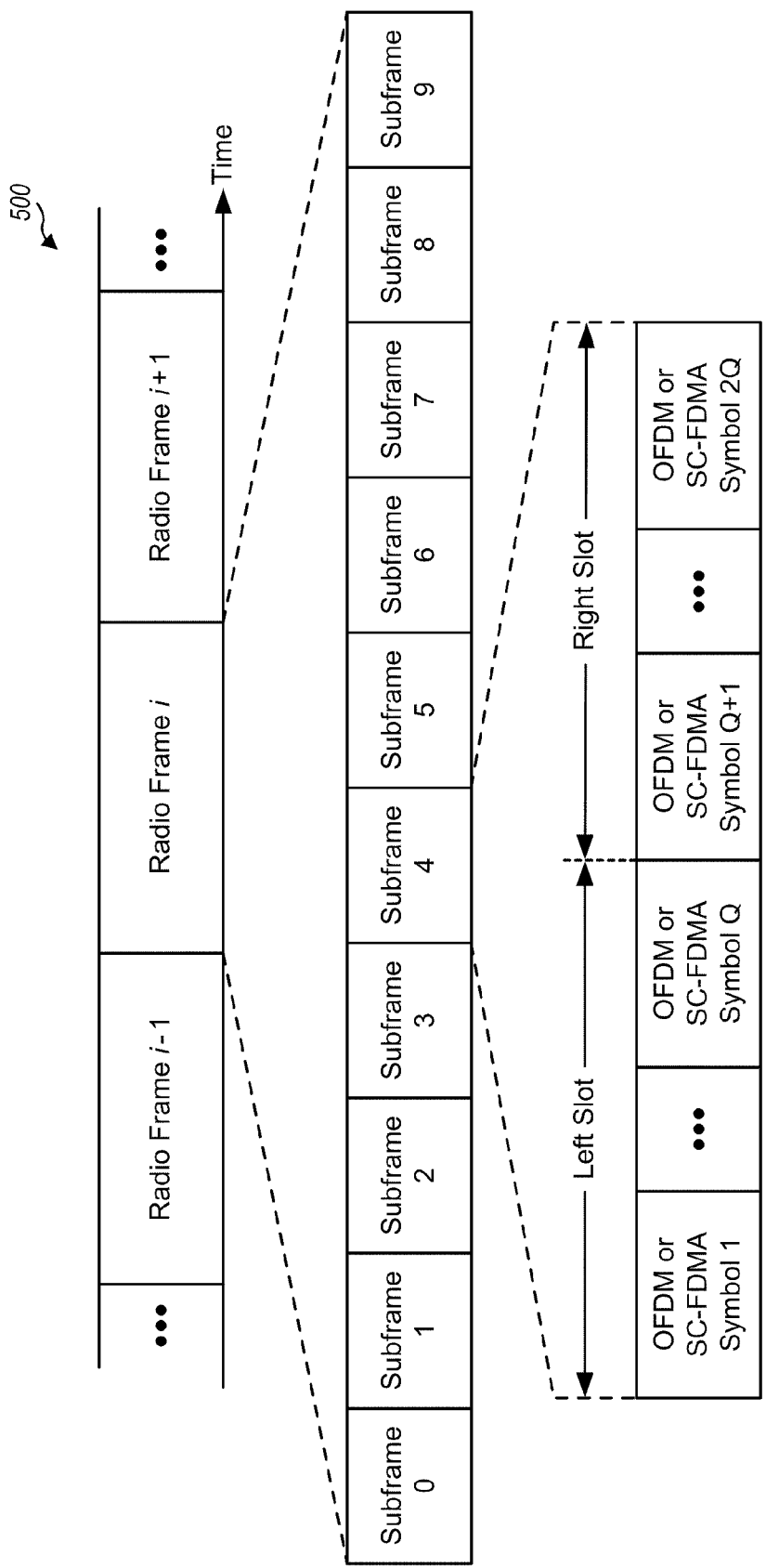
FIG. 5 shows an exemplary frame structure.

FIG. 5 shows a frame structure 500 that may be used for transmission on the downlink or uplink. The transmission timeline may be partitioned into units of radio frames. Each radio frame may have a predetermined duration (e.g., 10 milliseconds (ms)) and may be partitioned into 10 subframes with indices of 0 through 9. Each subframe may include two slots, and each slot may include Q symbol periods. In LTE, Q may be equal to 6 for an extended cyclic prefix or 7 for a normal cyclic prefix. On the downlink, 2Q OFDM symbols may be transmitted in the 2Q symbol periods of each subframe. On the uplink, 2Q SC-FDMA symbols may be transmitted in the 2Q symbol periods of each subframe.

Figure 6:
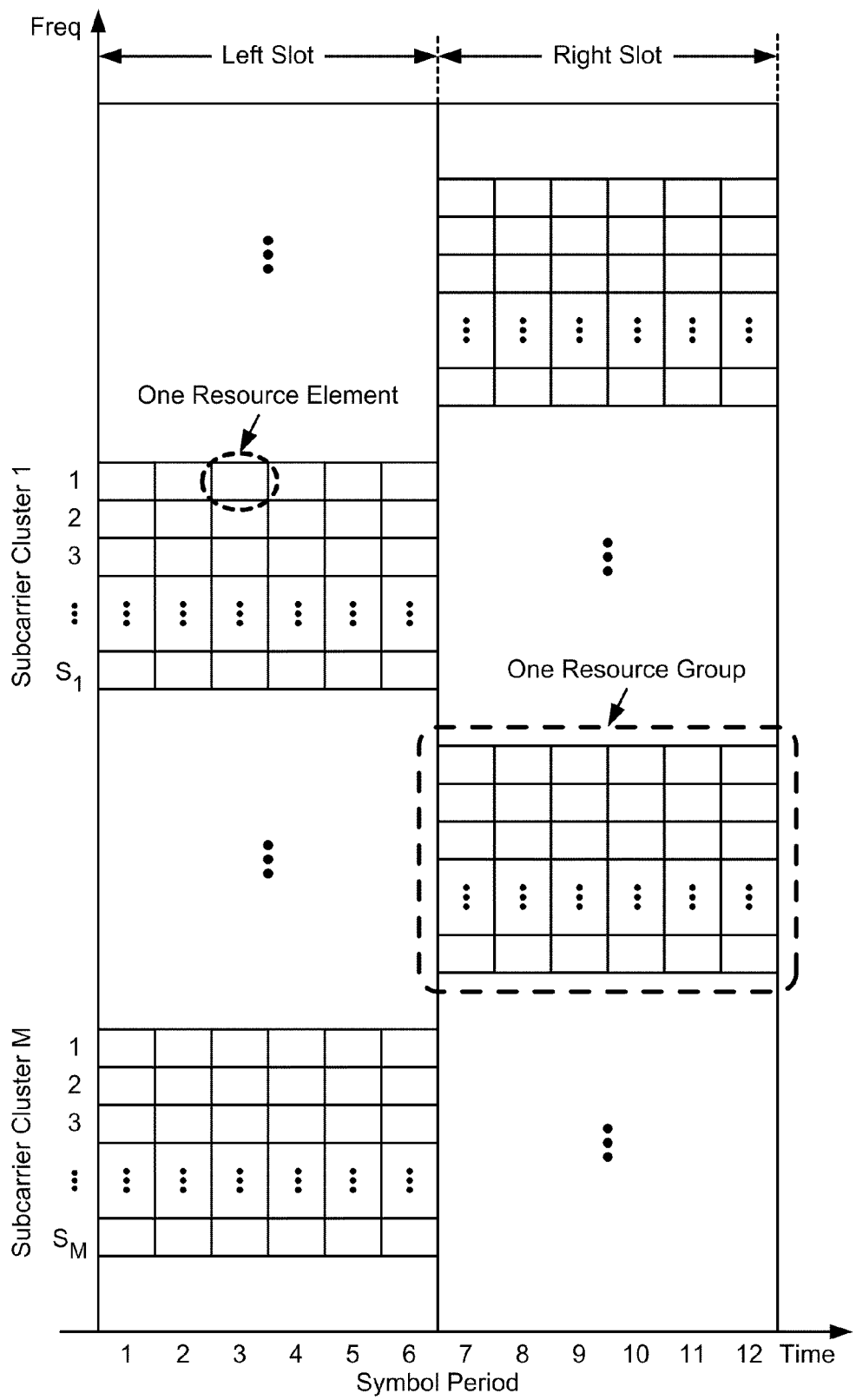
FIG. 6 shows an exemplary resource structure.

FIG. 6 shows a resource structure 600 that may be used for OFDMA on the downlink and NxSC-FDMA on the uplink. For both OFDMA and NxSC-FDMA, data may be transmitted on multiple non-contiguous bands. Each band may cover a cluster of contiguous subcarriers.

In one design, the time-frequency resources assigned for data transmission may be given by G resource groups, where G is greater than one. Each resource group may cover one cluster of subcarriers in one time interval. If intra-subframe frequency hopping is employed, then each resource group may cover one cluster of subcarriers in one slot, as shown in FIG. 6. In this case, G=2·M resource groups may be defined with M clusters of subcarriers in two slots. The left slot may include M resource groups, and the right slot may include another M resource groups, as shown in FIG. 6. If intra-subframe frequency hopping is not employed, then each resource group may cover one cluster of subcarriers in one subframe (not shown in FIG. 6). In this case, G=M resource groups may be defined with M clusters of subcarriers in one subframe. In general, the M clusters may include the same or different numbers of subcarriers, with cluster m including $S_m$ subcarriers, where $m \in \{1, \ldots, M\}$ and $S_m \geq 1$. The M clusters may include a total of S subcarriers, where $$S = \sum_m S_m.$$

Each resource group may include a number of resource elements. In particular, resource group g may include $K_g$ resource elements in P symbol periods of one time interval, where $K_g = S_g \cdot P$, $S_g$ is the number of subcarriers for resource group g, and $g \in \{1, \ldots, G\}$. The G resource groups may include a total of K resource elements, where $$K = \sum_g K_g.$$

For simplicity, much of the description below assumes no intra-subframe frequency hopping. In this case, M resource groups may be defined with M clusters of subcarriers. Resource group m may cover one cluster of $S_m$ contiguous subcarriers in one subframe and may include $K_m = S_m \cdot P$ resource elements, for $m \in 1, \ldots, M$.

Data may be transmitted on multiple resource groups with OFDMA or NxSC-FDMA. The multiple resource groups may experience different channel conditions and may have widely varying SINRs.

In an aspect, a channel interleaver may be used to map data symbols for each code block across both time and frequency in order to achieve similar SINRs for all N code blocks of a transport block. This SNR balancing may be especially desirable when the transport block is associated with a single ACK/NACK in order to reduce signaling overhead, as described above. Balancing the SINRs of the N code blocks may ensure that all code blocks will have similar probability of correct decoding. This may avoid performance loss due to one or few code blocks observing lower SINRs than remaining code blocks and causing a NACK to be sent for the transport block, which may trigger retransmission of all N code blocks. Balancing SINRs may be more beneficial when more code blocks can be transmitted for each transport block due to wider system bandwidth.

Various channel interleaver designs may be used to map the data symbols for each code block across both time and frequency. It may be desirable to perform channel interleaving in a structured or systematic manner. This may reduce complexity at both a transmitter station and a receiver station.

In a first channel interleaver design, the data symbols for the N code blocks may be selected sequentially and mapped to one resource group at a time, across subcarriers first and then across symbol periods for each resource group. The N code blocks may be cycled through, and the data symbols for the code blocks may be multiplexed to obtain a sequence of data symbols, D, as follows:

$$D=\{a_1, b_1, \ldots, n_1, a_2, b_2, \ldots, n_2, \ldots, a_L, b_L, \ldots, n_L\},$$ Eq (1)

where $\{a_1, a_2, \ldots, a_L\}$ are L data symbols for the first code block,
$\{b_1, b_2, \ldots, b_L\}$ are L data symbols for the second code block,
$\{n_1, n_2, \ldots, n_L,\}$ are L data symbols for the N-th code block, and
L is the number of data symbols for each code block.

The data symbols in sequence D may be selected sequentially and mapped to all resource elements in the first resource group, then to all resource elements in the second resource group, etc. For each resource group m, the data symbols may be mapped to resource elements across the $S_m$ subcarriers in the first symbol period, then to resource elements across the $S_m$ subcarriers in the next symbol period, etc.

FIG. 7 shows an example in which N=5 code blocks are processed to generate five sets of data symbols. L=19 data symbols with indices of 1 through 19 are generated for each code block. The first code block includes data symbols $a_1$ through $a_{19}$, the second code block includes data symbols $b_1$ through $b_{19}$, the third code block includes data symbols $c_1$ through $c_{19}$, the fourth code block includes data symbols $d_1$ through $d_{19}$, and the last code block includes data symbols $e_1$ through $e_{19}$.

Figure 8:
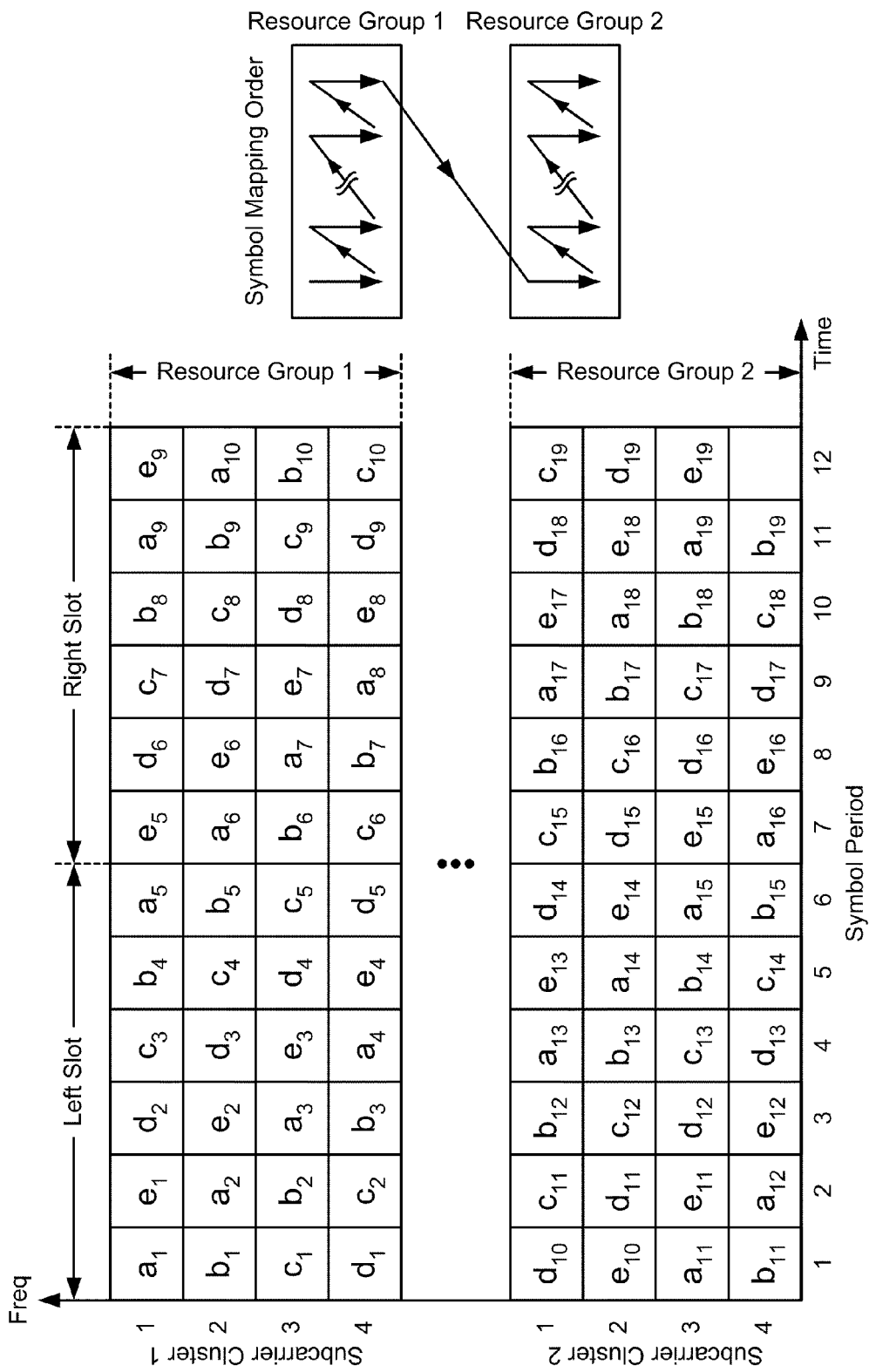
FIGS. 8 to 11 show mapping of the data symbols for the five code blocks to multiple resource groups based on four channel interleaver designs.

FIG. 8 shows an example of mapping data symbols for multiple code blocks to multiple resource groups based on the first channel interleaver design. In this example, M=2 resource groups are assigned for data transmission. Each resource group covers $S_m$=4 subcarriers with indices of 1 through 4 in P=12 symbol periods with indices of 1 through 12. Each resource group thus includes $K_m$=48 resource elements, and a total of K=96 resource elements are available for data transmission. The 12 symbol periods may belong in a subframe covering 14 symbol periods. The two remaining symbol periods in the subframe may be used to transmit a demodulation reference signal.

In the example shown in FIG. 8, N=5 code blocks are transmitted in the two resource groups. The data symbols in the five code blocks are shown in FIG. 7 and may be mapped to resource elements in the two resource groups. In particular, the data symbols may be selected sequentially from the five code blocks and multiplexed to obtain a sequence of data symbols, e.g., as shown in equation (1). The data symbols in the sequence may be mapped across subcarriers first and then across symbol periods in the first resource group, and then across subcarriers first and then across symbol periods in the second resource group.

In one design, the first data symbol in each resource group may be the next data symbol in the sequence after the last data symbol in the prior resource group. In the example shown in FIG. 8, the first data symbol $d_{10}$ in resource group 2 is the next data symbol in the sequence after the last data symbol $c_{10}$ in resource group 1. This design may ensure that all resource elements in each resource group are used before starting on the next resource group.

In another design, the first data symbol in each resource group may be for the first code block. In the example shown in FIG. 8, the first data symbol in resource group 2 may be data symbol $a_{10}$ or $a_{11}$ for the first code block. If the first data symbol in resource group 2 is $a_{10}$, then data symbols $a_{10}$, $b_{10}$ and $c_{10}$ may be retransmitted in resource group 2. If the first data symbol is $a_{11}$, then data symbols $d_{10}$ and $e_{10}$ may be deleted/punctured. This design may simplify the mapping of data symbols for the N code blocks to the M resource groups.

FIG. 8 shows a design in which data symbols are mapped across frequency first and then across time for each resource group. In another design, data symbols may be mapped across time first and then across frequency for each resource group.

For the first channel interleaver design, each code block may have approximately $K_m/N$ data symbols transmitted in resource group m. The number of data symbols from each code block in each resource group may thus be dependent on the size $K_m$ of that resource group and the number of code blocks. If $K_m$ is not divisible by N, then resource group m may include $\lceil K_m/N \rceil$ data symbols for each of the first Nr code blocks and may include $\lfloor K_m/N \rfloor$ data symbols for each of the remaining N−Nr code blocks, where "$\lceil\ \rceil$" denotes a ceiling operator, "$\lfloor\ \rfloor$" denotes a floor operator, and Nr is the remainder of $K_m$ divided by N.

In a second channel interleaver design, the data symbols for the N code blocks may be selected sequentially and mapped across the S subcarriers for all M resource groups, one symbol period at a time. The N code blocks may be cycled through, and the data symbols from the code blocks may be multiplexed to obtain a sequence of data symbols, e.g., as shown in equation (1). The data symbols in the sequence may be selected sequentially and mapped to all resource elements in the M resource groups in the first symbol period, then to all resource elements in the M resource groups in the second symbol period, etc.

Figure 9:
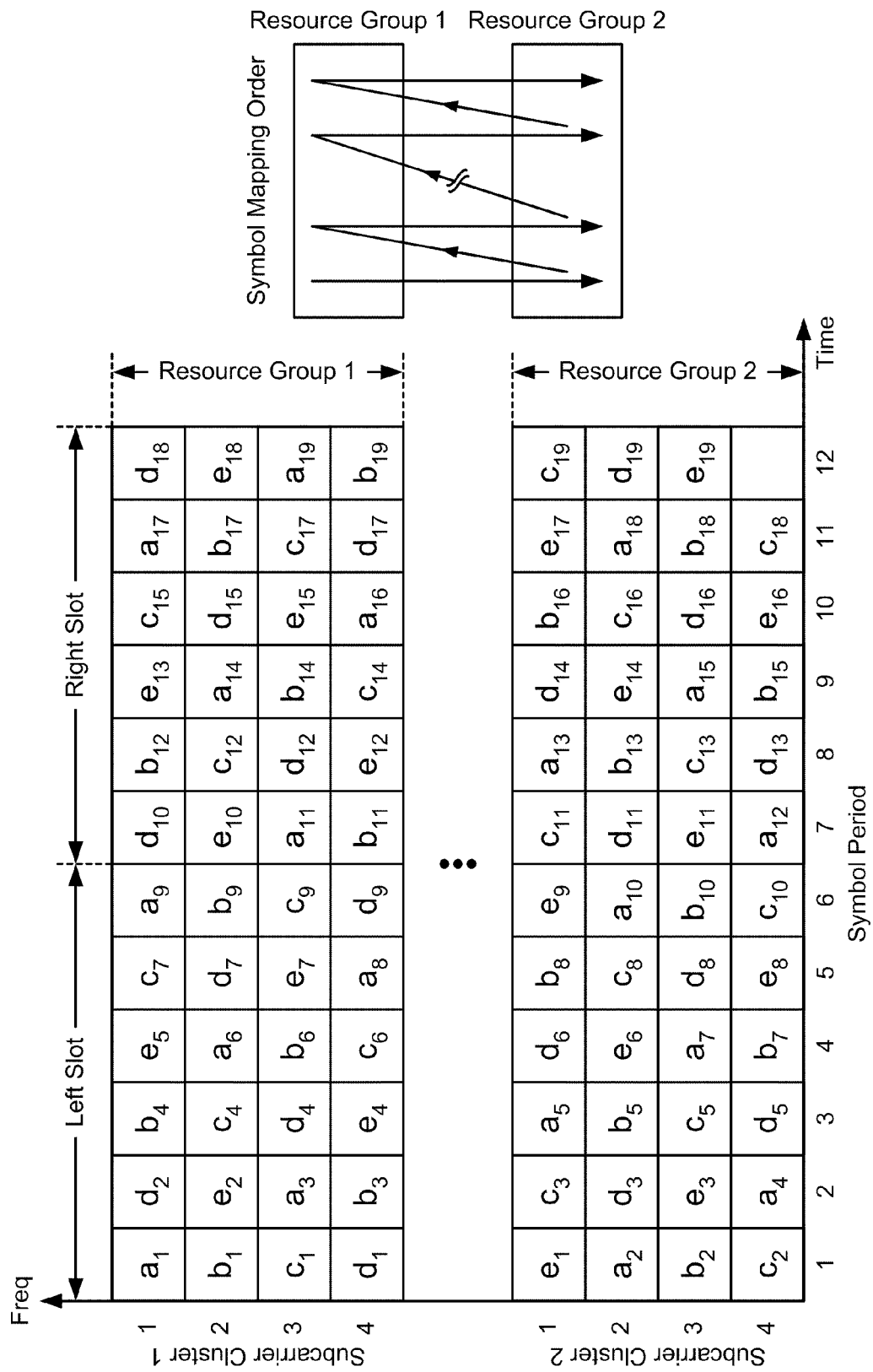

FIG. 9 shows an example of mapping data symbols for multiple code blocks to multiple resource groups based on the second channel interleaver design. In this example, M=2 resource groups are assigned for data transmission. Each resource group covers $S_m$=4 subcarriers in P=12 symbol periods and includes $K_m$=48 resource elements. In this example, N=5 code blocks are transmitted in the two resource groups. The data symbols for the five code blocks are shown in FIG. 7 and may be mapped to resource elements in the two resource groups as shown in FIG. 9.

The first and second channel interleaver designs may spread the data symbols for each code block across both time and frequency, e.g., as shown in FIGS. 8 and 9. The transmit power may be ramped up or down across the P symbol periods. Each code block would then observe the ramping of transmit power up or down across the P symbol periods. A receiver station may start decoding after an entire subframe is received.

In a third channel interleaver design, each code block may be partitioned in half. About half of the data symbols in each code block may be transmitted in the left slot, and the remaining half of the data symbols in each code block may be transmitted in the right slot. This partitioning may provide time diversity for each code block. The data symbols for the N code blocks may be partitioned into two sequences $D_1$ and $D_2$, as follows:

$$D_1=\{a_1, \ldots, a_{L/2}, b_1, \ldots, b_{L/2}, \ldots, n_1, \ldots, n_{L/2}\},$$ and Eq (2a)

$$D_2=\{a_{L/2+1}, \ldots, a_L, b_{L/2+1}, \ldots b_L, \ldots, n_{L/2+1}, \ldots, n_L\}.$$ Eq (2b)

Equation set (2) assumes that L is even. If L is odd, then the first sequence $D_1$ may include one more data symbol for about half of the code blocks, and the second sequence $D_2$ may include one more data symbol for the remaining code blocks. The first sequence of data symbols may be mapped to the M resource groups in the left slot. The second sequence of data symbols may be mapped to the M resource groups in the right slot.

In one design, in each slot, all data symbols $a_1$ to $a_{L/2}$ for the first code block may be mapped to resource elements across all subcarriers for the M resource groups in that slot, then all data symbols $b_1$ to $b_{L/2}$ for the second code block may be mapped to resource elements across all subcarriers for the M resource groups, etc. This mapping may provide frequency diversity for each code block. The mapping may start in the first symbol period of the slot and may proceed to the next symbol period when all resource elements in the previous symbol period are occupied. In one design, for each symbol period with data symbols for more than one code block, the data symbols for all code blocks transmitted in that symbol period may be shuffled in order to better balance the SINRs of these code blocks. In another design, the data symbols are not shuffled when more than one code block is transmitted in a given symbol period.

Figure 10:
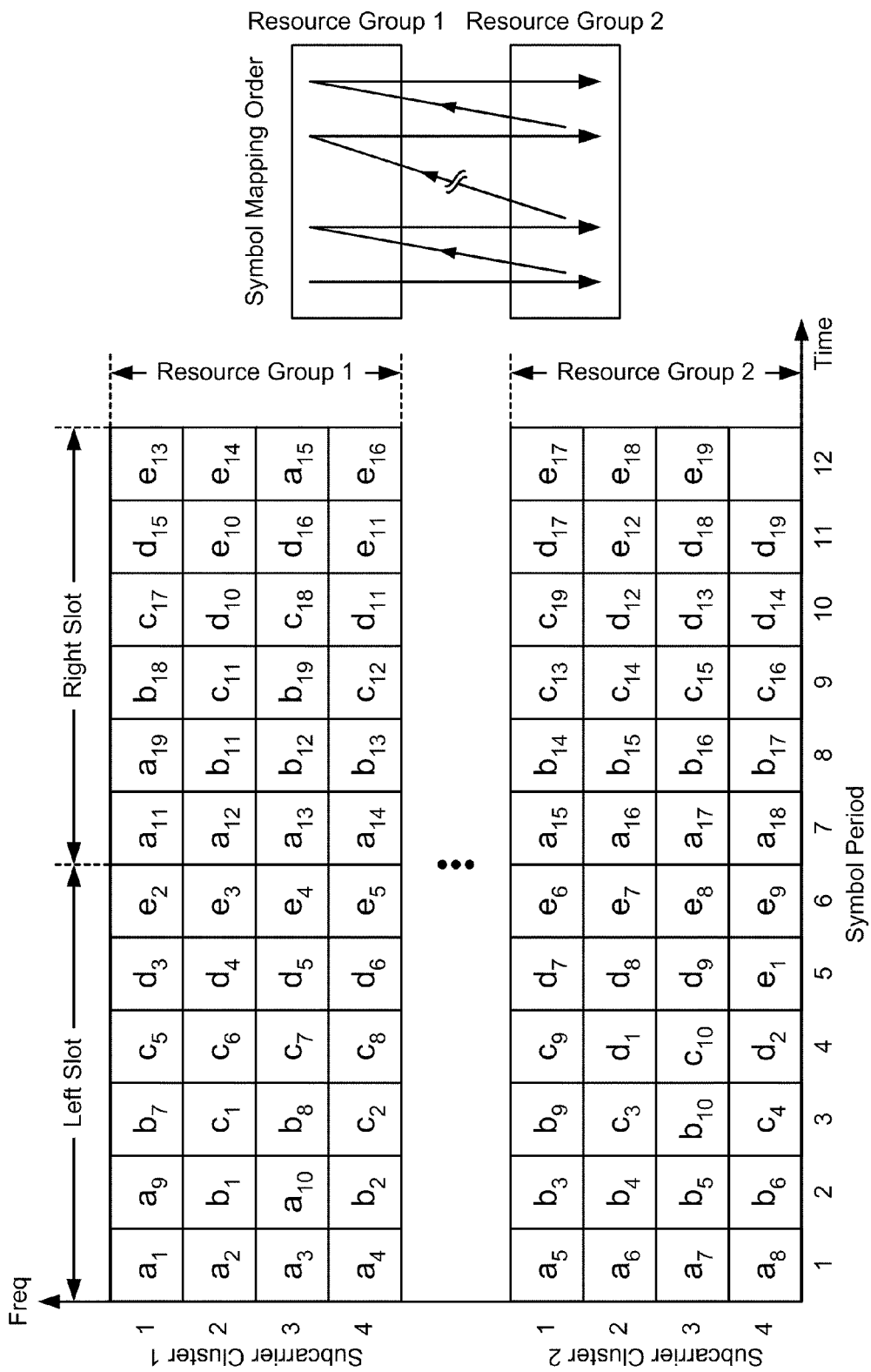

FIG. 10 shows an example of mapping data symbols for multiple code blocks to multiple resource groups based on the third channel interleaver design. In this example, M=2 resource groups are assigned for data transmission. Each resource group covers $S_m$=4 subcarriers in P=12 symbol periods and includes $K_m$=48 resource elements. In this example, N=5 code blocks are transmitted in the two resource groups. The data symbols for the five code blocks may be mapped to resource elements in the two resource groups as shown in FIG. 10.

As shown in FIG. 10, approximately half of the data symbols for each code block may be transmitted in each slot. For each slot, all data symbols for one code block may be mapped across all subcarriers for the M resource groups, then all data symbols in the next code block may be mapped across all subcarriers for the M resource groups, etc. In the example shown in FIG. 10, symbol periods 2, 3, 4, 5, 8, 9, 10 and 11 each includes data symbols from two code blocks. In one design, in each symbol period with data symbols from at least two code blocks, the data symbols for these code blocks may be shuffled by cycling through the code blocks and selecting one data symbol for each code block. For example, symbol period 2 includes data symbols for the first and second code blocks. The data symbols for these two code blocks may be shuffled by cycling through the two code blocks, selecting one data symbol $a_9$ for code block 1, then one data symbol $b_1$ for code block 2, then one data symbol $a_{10}$ for code block 1, and then data symbols $b_2$ to $b_6$ for code block 2 since no more data symbols for code block 1 remain in the first sequence. The shuffling of data symbols also occurs in symbol periods 3, 4, 9, 10 and 11. The shuffling of data symbols may also be performed in other manners or may be omitted.

The third channel interleaver design may map the data symbols for each code block across both time and frequency, e.g., as shown in FIG. 10. However, by mapping all data symbols from one code block at a time across all S subcarriers for the M resource groups, a receiver station may start decoding after receiving all data symbols for a code block and a demodulation reference signal transmitted in the right slot.

In a fourth channel interleaver design, the data symbols for the N code blocks may be partitioned into M sequences of data symbols for the M clusters of subcarriers, and each sequence of data symbols may be transmitted on a different cluster of subcarriers. The M sequences of data symbols may have the same size or different sizes, depending on the sizes of the M clusters of subcarriers. For a case in which two clusters of subcarriers are assigned, the data symbols for the N code blocks may be partitioned into two sequences $D_1$ and $D_2$, e.g., as shown in equation set (2). The data symbols for the N code blocks may also be partitioned into more than two sequences for more than two clusters of subcarriers. In any case, data symbol sequence $D_m$ may be transmitted on cluster m, for m=1, ..., M.

In one design, for each cluster of subcarriers, all data symbols for the first code block may be mapped across symbol periods starting with the first subcarrier in the cluster, then all data symbols for the second code block may be mapped across symbol periods, etc. This mapping may provide time diversity for each code block. The mapping may start with the first subcarrier in the cluster and may proceed to the next subcarrier when all symbol periods on the previous subcarrier are occupied. In one design, for each subcarrier with data symbols for more than one code block, the data symbols for all code blocks transmitted on that subcarrier may be shuffled in order to better balance the SINRs of these code blocks. In another design, the data symbols are not shuffled when more than one code block is transmitted on a given subcarrier.

Figure 11:
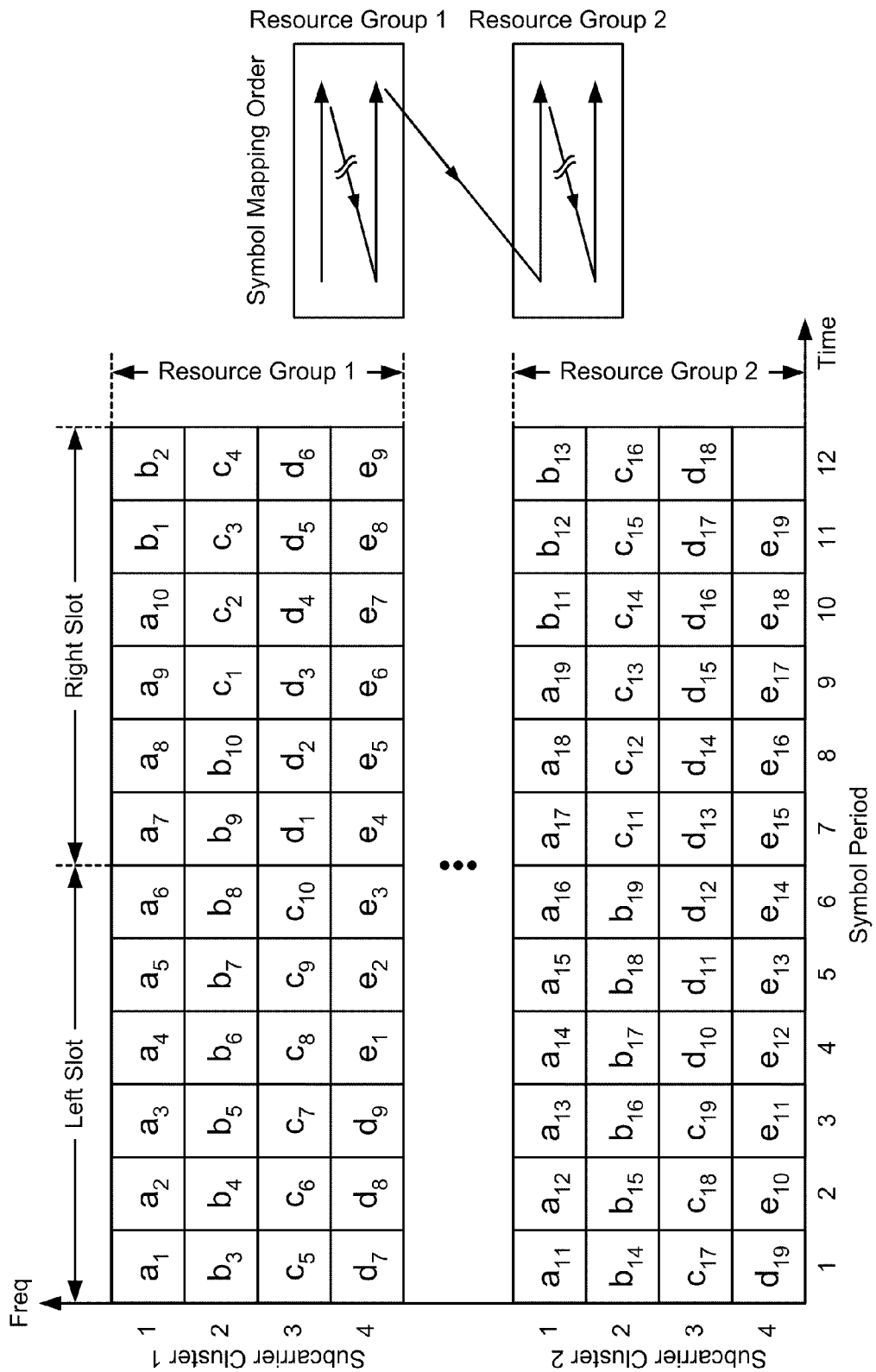

FIG. 11 shows an example of mapping data symbols for multiple code blocks to multiple resource groups based on the fourth channel interleaver design. In this example, M=2 resource groups covering two clusters of subcarriers are assigned for data transmission. Each resource group covers $S_m$=4 subcarriers in P=12 symbol periods and includes $K_m$=48 resource elements. In this example, N=5 code blocks are transmitted in the two resource groups. The data symbols for the five code blocks may be mapped to resource elements in the two resource groups as shown in FIG. 11.

As shown in FIG. 11, approximately 1/M-th of the data symbols for each code block may be transmitted on each cluster of subcarriers. For each cluster of subcarriers, all data symbols for one code block may be mapped to the first subcarrier across symbol periods, then all data symbols in the next code block may be mapped across symbol periods, etc. In one design that is not shown in FIG. 11, in each symbol period with data symbols for at least two code blocks, the data symbols for these code blocks may be shuffled by cycling through the code blocks and selecting one data symbol from each code block. In another design that is shown in FIG. 11, no shuffling of data symbols is performed.

FIGS. 8 through 11 show exemplary designs in which M resource groups cover M clusters of subcarriers in a subframe (i.e., with no intra-subframe frequency hopping). If intra-subframe frequency hopping is used, then 2M resource groups may cover M clusters of subcarriers in two slots of a subframe. The mapping described above may be applied in an analogous manner with and without frequency hopping.

In a fifth channel interleaver design, the data symbols for the N code blocks may be selected sequentially and mapped across symbol periods first and then across subcarriers. The N code blocks may be cycled through, and the data symbols for the code blocks may be multiplexed to obtain a sequence of data symbols, e.g., as shown in equation (1). The data symbols in the sequence may be selected sequentially and mapped across the P symbol periods on the first subcarrier in the M resource groups, then across the P symbol periods on the second subcarrier, etc.

The first through fifth channel interleaver designs are exemplary designs that may be used to map data symbols for each code block across time and frequency in a structured or systematic manner. The first design in FIG. 8, the second design in FIG. 9, and the fourth design in FIG. 11 may ensure that power ramping similarly affect all code blocks. The third design in FIG. 10 may result in the first and last code blocks being more susceptible to power ramping.

Channel interleaving may also be performed in a structured manner based on other designs. Channel interleaving may be performed across time first and then across frequency, or across frequency first and then across time. Channel interleaving may also be performed across all M resource groups, or for one resource group at a time, or for a small number of resource groups at a time.

In a sixth channel interleaver design, the data symbols for multiple code blocks may be mapped to resource elements in multiple resource groups in a pseudo-random manner. The pseudo-random channel interleaving may be based on a bit-reversal interleaver, a pruned bit-reversal interleaver, a linear congruential sequence, etc. Complexity of pseudo-random interleaving may be higher than that of structured interleaving.

In another aspect, M transport blocks may be transmitted on M clusters of subcarriers, one transport block for each cluster of subcarriers. Transport block m may be transmitted on cluster m and may include $N_m$ code blocks, where $N_m \geq 1$. Data symbols for the $N_m$ code blocks in transport block m may be mapped to resource elements in cluster m. In one design, a separate modulation and coding scheme may be selected for each transport block and may be used for all $N_m$ code blocks of the transport block. In another design, the same modulation and coding scheme may be used for all M transport blocks. Signaling may be sent to indicate pertinent information for each transport block, e.g., the transport format, the number of code blocks, etc.

In one design, an ACK or a NACK may be sent for each transport block. In this design, an ACK may be sent for a transport block if all code blocks for the transport block are decoded correctly, and a NACK may be sent otherwise. In another design, an ACK or a NACK may be sent for each code block. In this design, a total of M ACKs/NACKs may be sent for the M transport blocks if each transport block includes a single code block. More ACKs/NACKs may be sent if each transport block includes multiple code blocks.

The channel interleaving techniques described herein may also be used for the following scenarios:
- Transmit data on a Physical Downlink Shared Channel (PDSCH) with OFDMA,
- Transmit data on a Physical Uplink Shared Channel (PUSCH) with SC-FDMA,
- Transmit control information on a Physical Uplink Control Channel (PUCCH), and
- Transmit data and control information on the PUSCH.

A UE may transmit only control information on the PUCCH. If NxSC-FDMA is used for the PUCCH, then modulation symbols for the control information may be demultiplexed to multiple M sub-blocks for M clusters of subcarriers. Each sub-block of modulation symbols may be processed with a discrete Fourier transform (DFT) and mapped to the subcarriers in the associated cluster. Each modulation symbol may be spread across an entire cluster of subcarriers by the spreading property of DFT. The techniques described herein may be used to map the modulation symbols for the control information to different clusters of subcarriers to achieve frequency diversity as well as balanced SINR.

The UE may also transmit control information along with data on the PUSCH, and the PUCCH may be piggybacked with the PUSCH. In this case, modulation symbols for the control information may be considered as being for one code block that may be mapped to different resource groups based on any of the channel interleaver designs described above.

The channel interleaving techniques described herein may combat high Doppler scenario, which may result in different SINRs across the resources assigned for data transmission. By mapping each code block across both time and frequency, all code blocks may achieve similar SINRs, which may improve performance. Furthermore, mapping each code block across time may result in the code blocks observing similar power ramping in a subframe.

FIG. 12 shows a design of a process 1200 for transmitting data in a wireless communication system. Process 1200 may be performed by a transmitter station, which may be a base station/eNB for data transmission on the downlink or a UE for data transmission on the uplink.

The transmitter station may determine a plurality of resource groups assigned for data transmission (block 1212). Each resource group may include a plurality of resource elements formed by a cluster of subcarriers in a time interval. The time interval may cover a slot, a subframe, or some other time duration. The plurality of resource groups may cover a plurality of non-contiguous clusters of subcarriers and may cover one or more time intervals.

The transmitter station may partition a transport block into a plurality of code blocks (block 1214). The transmitter station may process (e.g., encode and modulate) each code block to obtain data symbols for the code block (block 1216). The transmitter station may map the data symbols for each code block to at least one resource element in each of the plurality of resource groups (block 1218).

The transmitter station may transmit the mapped data symbols for the plurality of code blocks to a receiver station (block 1220). In one design, the transmitter station may receive an ACK or a NACK for the transport block from the receiver station (block 1222) and may retransmit the plurality of code blocks if a NACK is received for the transport block (block 1224). In another design, the transmitter station may receive an ACK or a NACK for each code block and may retransmit each code block for which a NACK is received.

In one design of block 1218, which is shown in FIG. 8, transmitter station may select data symbols for the plurality of code blocks by cycling through the code blocks and selecting one data symbol from each code block. The transmitter station may map the selected data symbols to one resource group at a time, across all subcarriers for one symbol period at a time for each resource group.

In another design of block 1218, which is shown in FIG. 9, the transmitter station may select data symbols for the plurality of code blocks by cycling through the code blocks. The transmitter station may then map the selected data symbols to the plurality of resource groups, across all subcarriers for the resource groups for one symbol period at a time.

In yet another design of block 1218, which is shown in FIG. 10, the time interval may cover a plurality of slots. The transmitter station may form a plurality of sequences of data symbols for the plurality of slots, one sequence of data symbols for each slot. Each sequence of data symbols may comprise a subset of the data symbols for each code block. The transmitter station may map each sequence of data symbols to the plurality of resource groups in a corresponding slot, across all subcarriers for the plurality of resource groups in one symbol period at a time.

In yet another design of block 1218, which is shown in FIG. 11, the transmitter station may form a plurality of sequences of data symbols for the plurality of resource groups, one sequence of data symbols for each resource group. Each sequence of data symbols may comprise a subset of the data symbols for each code block. The transmitter station may map each sequence of data symbols to a corresponding resource group, across a plurality of symbol periods in the time interval for one subcarrier at a time.

In yet another design of block 1218, the transmitter station may map the data symbols for the plurality of code blocks to resource elements in the plurality of resource groups based on pseudo-random interleaving. The transmitter station may also map the data symbols for the plurality of code blocks across frequency and time in other manners.

FIG. 13 shows a design of a process 1300 for receiving data in a wireless communication system. Process 1300 may be performed by a receiver station, which may be a UE for data transmission on the downlink or a base station/eNB for data transmission on the uplink.

The receiver station may determine a plurality of resource groups used for data transmission (block 1312). Each resource group may include a plurality of resource elements formed by a cluster of subcarriers in a time interval. The receiver station may obtain received symbols from the plurality of resource groups (block 1314). The receiver station may demultiplex the received symbols into a plurality of blocks corresponding to a plurality of code blocks (block 1316). Each block may include received symbols for one code block, and these received symbols may be obtained from at least one resource element in each of the plurality of resource groups. The receiver station may demultiplex the received symbols from the plurality of resource groups in a manner complementary to channel interleaving performed by a transmitter station for the plurality of code blocks. The transmitter station may perform channel interleaving based on any of the channel interleaver design described above. The receiver station may decode the plurality of blocks of received symbols to obtain the plurality of code blocks (block 1318).

The receiver station may multiplex the plurality of code blocks to obtain a transport block (block 1320). In one design, the receiver station may send an ACK for the transport block if the plurality of code blocks are decoded correctly (block 1322). The receiver station may send a NACK for the transport block if any one of the plurality of code blocks is decoded in error (block 1324). In another design, the receiver station may send an ACK or a NACK for each code block.

Figure 14:
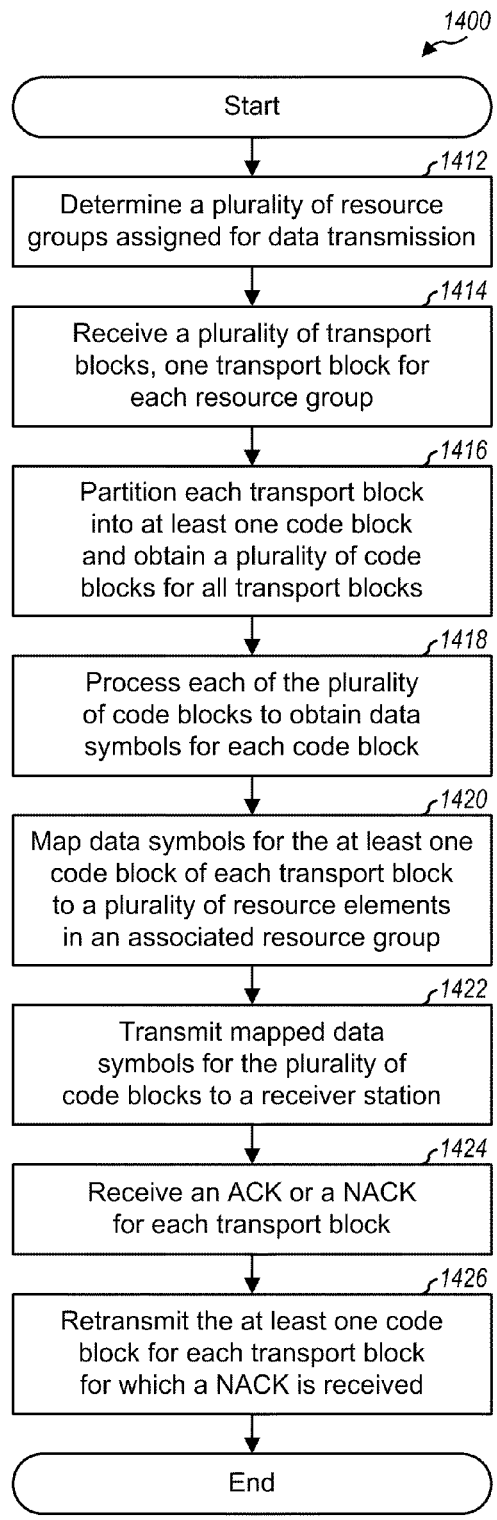
FIG. 14 shows another process for transmitting data.

FIG. 14 shows a design of a process 1400 performed by a transmitter station to transmit data in a wireless communication system. The transmitter station may determine a plurality of resource groups assigned for data transmission (block 1412). Each resource group may include a plurality of resource elements formed by a cluster of subcarriers in a time interval. The transmitter station may receive a plurality of transport blocks, one transport block for each resource group (block 1414). The transmitter station may partition each of the plurality of transport blocks into at least one code block to be transmitted on one resource group (block 1416). The transmitter station may obtain a plurality of code blocks from the partitioning and may process each code block to obtain data symbols for that code block (block 1418). The transmitter station may map data symbols for the at least one code block of each transport block to the plurality of resource elements in the associated resource group (block 1420).

The transmitter station may transmit the mapped data symbols for the plurality of code blocks to a receiver station (block 1422). The transmitter station may receive an ACK or a NACK for each transport block (block 1424). The transmitter station may retransmit the at least one code block for each transport block for which a NACK is received (block 1426).

Figure 15:
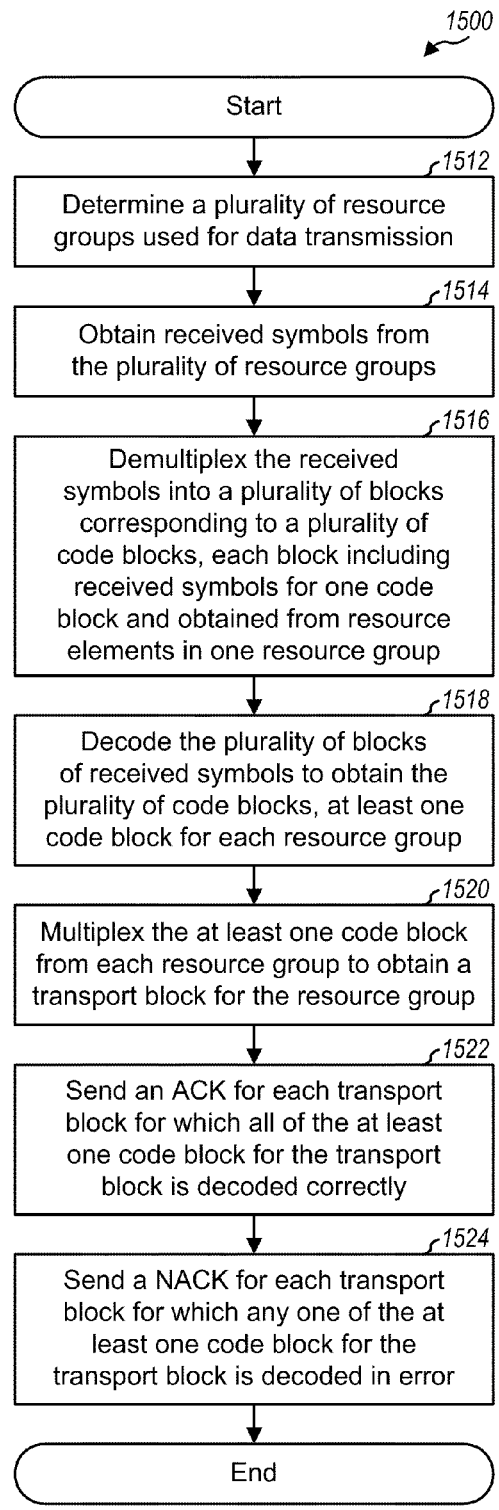
FIG. 15 shows another process for receiving data.

FIG. 15 shows a design of a process 1500 performed by a receiver station to receive data in a wireless communication system. The receiver station may determine a plurality of resource groups used for data transmission (block 1512). Each resource group includes a plurality of resource elements formed by a cluster of subcarriers in a time interval. The receiver station may obtain received symbols from the plurality of resource groups (block 1514). The receiver station may demultiplex the received symbols into a plurality of blocks corresponding to a plurality of code blocks (block 1516). Each block may include received symbols for one code block, and these received symbols may be obtained from resource elements in one resource group. The receiver station may decode the plurality of blocks of received symbols to obtain the plurality of code blocks, at least one code block for each resource group (block 1518).

The receiver station may multiplex the at least one code block from each resource group to obtain a transport block for the resource group (block 1520). The receiver station may send an ACK for each transport block for which all of the at least one code block for the transport block is decoded correctly (block 1522). The receiver station may sending a NACK for each transport block for which any one of the at least one code block for the transport block is decoded in error (block 1524).

In one configuration, apparatus 110 and/or 120 for wireless communication in FIG. 2 may include means for determining a plurality of resource groups assigned for data transmission, means for processing each of a plurality of code blocks to obtain data symbols for each code block, and means for mapping the data symbols for each code block to at least one resource element in each of the plurality of resource groups. In one aspect, the aforementioned means may be processor 220 and/or 240 in apparatus 110 (or processor 264 and/or 280 in apparatus 120) configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of transmitting data in a wireless communication system, comprising:
    determining a plurality of resource groups assigned for data transmission, each resource group including a plurality of resource elements formed by a cluster of consecutive subcarriers in a time interval;
    processing each of a plurality of code blocks to obtain data symbols for each code block; and
    mapping the data symbols for each code block to at least one resource element in each of the plurality of resource groups in accordance with a mapping scheme that
    balances the signal-to-noise-and-interference ratio (SINR) of each of the plurality of code blocks, wherein balancing comprises shuffling the mapped data symbols for the plurality of code blocks.

2. The method of claim 1, further comprising:
    partitioning a transport block into the plurality of code blocks;
    transmitting mapped data symbols for the plurality of code blocks to a receiver station;
    receiving an acknowledgement (ACK) or a negative acknowledgement (NACK) for the transport block from the receiver station; and
    retransmitting the plurality of code blocks if a NACK is received for the transport block.

3. The method of claim 1, wherein the mapping the data symbols comprises
    selecting data symbols for the plurality of code blocks by cycling through the plurality of code blocks and selecting one data symbol for each code block, and
    mapping the selected data symbols to one resource group at a time, across all subcarriers in one symbol period at a time.

4. The method of claim 1, wherein the mapping the data symbols comprises
    selecting data symbols for the plurality of code blocks by cycling through the plurality of code blocks and selecting one data symbol for each code block, and
    mapping the selected data symbols to the plurality of resource groups, across all subcarriers for the plurality of resource groups in one symbol period at a time.

5. The method of claim 1, wherein the time interval covers a plurality of slots, and wherein the mapping the data symbols comprises
    forming a plurality of sequences of data symbols for the plurality of slots, one sequence of data symbols for each slot, each sequence of data symbols comprising a subset of the data symbols for each code block, and
    mapping each sequence of data symbols to the plurality of resource groups in a corresponding slot, across all subcarriers for the plurality of resource groups in one symbol period at a time.

6. The method of claim 1, wherein the mapping the data symbols comprises
    forming a plurality of sequences of data symbols for the plurality of resource groups, one sequence of data symbols for each resource group, each sequence of data symbols comprising a subset of the data symbols for each code block, and
    mapping each sequence of data symbols to a corresponding resource group, across a plurality of symbol periods in the time interval for one subcarrier at a time.

7. The method of claim 1, wherein the mapping the data symbols comprises
mapping data symbols for the plurality of code blocks to resource elements in the plurality of resource groups based on pseudo-random interleaving.

8. An apparatus for wireless communication, comprising:
means for determining a plurality of resource groups assigned for data transmission, each resource group including a plurality of resource elements formed by a cluster of consecutive subcarriers in a time interval;
means for processing each of a plurality of code blocks to obtain data symbols for each code block; and
means for mapping the data symbols for each code block to at least one resource element in each of the plurality of resource groups in accordance with a mapping scheme that
balances the signal-to-noise-and-interference ratio (SINR) of each of the plurality of code blocks, wherein balancing comprises shuffling the mapped data symbols for the plurality of code blocks.

9. The apparatus of claim 8, further comprising:
means for partitioning a transport block into the plurality of code blocks;
means for transmitting mapped data symbols for the plurality of code blocks to a receiver station;
means for receiving an acknowledgement (ACK) or a negative acknowledgement (NACK) for the transport block from the receiver station; and
means for retransmitting the plurality of code blocks if a NACK is received for the transport block.

10. The apparatus of claim 8, wherein the means for mapping the data symbols comprises
means for selecting data symbols for the plurality of code blocks by cycling through the plurality of code blocks and selecting one data symbol for each code block, and
means for mapping the selected data symbols to one resource group at a time, across all subcarriers in one symbol period at a time.

11. The apparatus of claim 8, wherein the means for mapping the data symbols comprises
means for selecting data symbols for the plurality of code blocks by cycling through the plurality of code blocks and selecting one data symbol for each code block, and
means for mapping the selected data symbols to the plurality of resource groups, across all subcarriers for the plurality of resource groups in one symbol period at a time.

12. The apparatus of claim 8, wherein the time interval covers a plurality of slots, and wherein the means for mapping the data symbols comprises
means for forming a plurality of sequences of data symbols for the plurality of slots, one sequence of data symbols for each slot, each sequence of data symbols comprising a subset of the data symbols for each code block, and
means for mapping each sequence of data symbols to the plurality of resource groups in a corresponding slot, across all subcarriers for the plurality of resource groups in one symbol period at a time.

13. The apparatus of claim 8, wherein the means for mapping the data symbols comprises
means for forming a plurality of sequences of data symbols for the plurality of resource groups, one sequence of data symbols for each resource group, each sequence of data symbols comprising a subset of the data symbols for each code block, and
means for mapping each sequence of data symbols to a corresponding resource group, across a plurality of symbol periods in the time interval for one subcarrier at a time.

14. An apparatus for wireless communication, comprising:
at least one processor configured to determine a plurality of resource groups assigned for data transmission, each resource group including a plurality of resource elements formed by a cluster of consecutive subcarriers in a time interval, to process each of a plurality of code blocks to obtain data symbols for each code block, and to map the data symbols for each code block to at least one resource element in each of the plurality of resource groups in accordance with a mapping scheme that balances the signal-to-noise-and-interference ratio (SINR) of each of the plurality of code blocks, wherein balancing comprises shuffling the mapped data symbols for the plurality of code blocks.

15. The apparatus of claim 14, wherein the at least one processor is configured to partition a transport block into the plurality of code blocks, to transmit mapped data symbols for the plurality of code blocks to a receiver station, to receive an acknowledgement (ACK) or a negative acknowledgement (NACK) for the transport block from the receiver station, and to retransmit the plurality of code blocks if a NACK is received for the transport block.

16. A computer program product, comprising:
a non-transitory computer-readable medium comprising:
code for causing at least one processor to determine a plurality of resource groups assigned for data transmission, each resource group including a plurality of resource elements formed by a cluster of consecutive subcarriers in a time interval,
code for causing the at least one processor to process each of a plurality of code blocks to obtain data symbols for each code block, and
code for causing the at least one processor to map the data symbols for each code block to at least one resource element in each of the plurality of resource groups in accordance with a mapping scheme that balances the signal-to-noise-and-interference ratio (SINR) of each of the plurality of code blocks, wherein balancing comprises shuffling the mapped data symbols for the plurality of code blocks.

17. A method of receiving data in a wireless communication system, comprising:
determining a plurality of resource groups used for data transmission, each resource group including a plurality of resource elements formed by a cluster of consecutive subcarriers in a time interval;
obtaining received shuffled symbols from the plurality of resource groups, wherein the received shuffled symbols were mapped in accordance with a mapping scheme that balanced the signal-to-noise-and-interference ratio (SINR) of each of a plurality of code blocks;
demultiplexing the received shuffled symbols into a plurality of blocks corresponding to the plurality of code blocks, each block including received shuffled symbols for one code block and obtained from at least one resource element in each of the plurality of resource groups; and
decoding the plurality of blocks of received shuffled symbols to obtain the plurality of code blocks.

18. The method of claim 17, further comprising:
multiplexing the plurality of code blocks to obtain a transport block;

sending an acknowledgement (ACK) for the transport block if the plurality of code blocks are decoded correctly; and sending a negative acknowledgement (NACK) for the transport block if any one of the plurality of code blocks is decoded in error.

19. The method of claim 17, wherein the demultiplexing the received symbols comprises demultiplexing the received symbols complementary to channel interleaving for the plurality of code blocks by a transmitter station, the transmitter station selecting data symbols for the plurality of code blocks by cycling through the plurality of code blocks and selecting one data symbol for each code block, and mapping the selected data symbols to one resource group at a time, across all subcarriers in one symbol period at a time.

20. The method of claim 17, wherein the demultiplexing the received symbols comprises demultiplexing the received symbols complementary to channel interleaving for the plurality of code blocks by a transmitter station, the transmitter station selecting data symbols for the plurality of code blocks by cycling through the plurality of code blocks and selecting one data symbol for each code block, and mapping the selected data symbols to the plurality of resource groups, across all subcarriers for the plurality of resource groups in one symbol period at a time.

21. The method of claim 17, wherein the demultiplexing the received symbols comprises demultiplexing the received symbols complementary to channel interleaving for the plurality of code blocks by a transmitter station, the transmitter station forming a plurality of sequences of data symbols for the plurality of slots, one sequence of data symbols for each slot, each sequence of data symbols comprising a subset of data symbols for each code block, and mapping each sequence of data symbols to the plurality of resource groups in a corresponding slot, across all subcarriers for the plurality of resource groups in one symbol period at a time.

22. The method of claim 17, wherein the demultiplexing the received symbols comprises demultiplexing the received symbols complementary to channel interleaving for the plurality of code blocks by a transmitter station, the transmitter station forming a plurality of sequences of data symbols for the plurality of resource groups, one sequence of data symbols for each resource group, each sequence of data symbols comprising a subset of data symbols for each code block, and mapping each sequence of data symbols to a corresponding resource group, across a plurality of symbol periods in the time interval for one subcarrier at a time.

23. The method of claim 17, wherein the demultiplexing the received symbols comprises demultiplexing the received symbols complementary to pseudo-random interleaving performed by a transmitter station to map data symbols for the plurality of code blocks to resource elements in the plurality of resource groups.

24. An apparatus for wireless communication, comprising:

means for determining a plurality of resource groups used for data transmission, each resource group including a plurality of resource elements formed by a cluster of consecutive subcarriers in a time interval;

means for obtaining received shuffled symbols from the plurality of resource groups, wherein the received shuffled symbols were mapped in accordance with a mapping scheme that balanced the signal-to-noise-and-interference ratio (SINR) of each of a plurality of code blocks;

means for demultiplexing the received shuffled symbols into a plurality of blocks corresponding to the plurality of code blocks, each block including received shuffled symbols for one code block and obtained from at least one resource element in each of the plurality of resource groups; and means for decoding the plurality of blocks of received shuffled symbols to obtain the plurality of code blocks.

25. The apparatus of claim 24, further comprising:

means for multiplexing the plurality of code blocks to obtain a transport block;

means for sending an acknowledgement (ACK) for the transport block if the plurality of code blocks are decoded correctly; and means for sending a negative acknowledgement (NACK) for the transport block if any one of the plurality of code blocks is decoded in error.

26. A method of transmitting data in a wireless communication system, comprising:

determining a plurality of resource groups assigned for data transmission, each resource group including a plurality of resource elements formed by a cluster of consecutive subcarriers in a time interval;

processing each of a plurality of code blocks to obtain data symbols for each code block;

mapping the plurality of code blocks to the plurality of resource groups, each code block being mapped to one resource group, and at least one code block being mapped to each resource group; and mapping data symbols for the at least one code block for each resource group to the plurality of resource elements in the resource group in accordance with a mapping scheme that balances the signal-to-noise-and-interference ratio (SINR) of each of the plurality of code blocks, wherein balancing comprises shuffling the mapped data symbols for the plurality of code blocks.

27. The method of claim 26, further comprising:

receiving a plurality of transport blocks, one transport block for each resource group;

partitioning each of the plurality of transport blocks into at least one code block;

transmitting mapped data symbols for the plurality of code blocks to a receiver station;

receiving an acknowledgement (ACK) or a negative acknowledgement (NACK) for each transport block; and retransmitting the at least one code block for each transport block for which a NACK is received.

28. A method of receiving data in a wireless communication system, comprising:

determining a plurality of resource groups used for data transmission, each resource group including a plurality of resource elements formed by a cluster of consecutive subcarriers in a time interval;

obtaining received shuffled symbols from the plurality of resource groups, wherein the received shuffled symbols were mapped in accordance with a mapping scheme that balanced the signal-to-noise-and-interference ratio (SINR) of each of a plurality of code blocks;

demultiplexing the received shuffled symbols into a plurality of blocks corresponding to the plurality of code blocks, each block including received shuffled symbols for one code block and obtained from resource elements in one resource group; and decoding the plurality of blocks of received shuffled symbols to obtain the plurality of code blocks, at least one code block for each resource group.

29. The method of claim 28, further comprising:

multiplexing the at least one code block from each resource group to obtain a transport block for the resource group;

sending an acknowledgement (ACK) for each transport block for which all of the at least one code block for the transport block is decoded correctly; and sending a negative acknowledgement (NACK) for each transport block for which any one of the at least one code block for the transport block is decoded in error.

* * * * *